United States Patent [19]

Atarashi et al.

[11] Patent Number: 4,971,521

[45] Date of Patent: Nov. 20, 1990

[54] AIRFOIL BLADE FOR IMPELLER FAN AND MANUFACTURING METHOD THEREOF

[75] Inventors: Masahiro Atarashi, Kusatsu; Shotaro Ito, Shiga; Kiyoshi Sano; Kazuaki Yamamoto, both of Otsu, all of Japan

[73] Assignee: Matsushita Electric Industrial Co., Ltd., Osaka, Japan

[21] Appl. No.: 343,878

[22] Filed: Apr. 27, 1989

[30] Foreign Application Priority Data

Apr. 28, 1988 [JP]  Japan .................................. 63-106344

[51] Int. Cl.⁵ .............................................. B64C 11/24
[52] U.S. Cl. .................. 416/233; 416/231 R; 415/119; 29/889.72
[58] Field of Search ............... 416/233, 241 A, 231 R, 416/231 B; 415/119; 29/889.72, 463

[56] References Cited

U.S. PATENT DOCUMENTS

| | | | |
|---|---|---|---|
| 2,454,200 | 11/1948 | Perkins | 416/233 |
| 2,541,661 | 2/1951 | Palmatier et al. | 416/233 |
| 2,701,696 | 2/1955 | Felt | 416/233 |
| 2,975,962 | 3/1961 | Busquet | 416/233 |
| 3,093,219 | 6/1963 | Ramme | 416/233 |
| 3,429,023 | 2/1969 | Blythe et al. | 416/233 |
| 4,417,381 | 11/1983 | Higgenbotham | 416/233 |

FOREIGN PATENT DOCUMENTS 60-12959  4/1985  Japan .
62-14397  4/1987  Japan .

*Primary Examiner*—John T. Kwon
*Attorney, Agent, or Firm*—Wenderoth, Lind & Ponack

[57] ABSTRACT

An airfoil blade for a fan impeller, includes one blade surface portion formed by extrusion molding. A plurality of ribs are integrally formed with the one blade surface portion to extend upwardly from it in generally a vertical direction and having heights as will provide a curve line for the other curved blade surface portion when end faces of the ribs are connected to each other. A sheet material is applied onto the ribs along their end faces to provide the other curved blade surface portion so as to form a blade configuration of the airfoil blade having a leading edge and a trailing edge and including hollow portions in it.

1 Claim, 2 Drawing Sheets

AIRFOIL BLADE FOR IMPELLER FAN AND MANUFACTURING METHOD THEREOF

BACKGROUND OF THE INVENTION

The present invention generally relates to a fan impeller for use in an air conditioner or the like, and more particularly, to airfoil blades for a fan impeller, and also manufacturing method thereof.

It has been a recent trend that airfoil blades have been employed not only for large-sized blowers, but also for blowers in domestic use as well, for the purpose of improving performance of such blowers.

Conventionally, for manufacturing such airfoil blades, it has been so arranged, for example, as shown in FIG. 3, that a blade 14 of a generally hollow structure fundamentally includes an inner frame having a plurality of ribs 20 and 26 provided to be arranged from a leading edge to a trailing edge of the blade 14, and an upper surface wall 28 and a lower surface wall 30 applied onto the inner frame to provide a surface wall assembly, thereby forming a desired airfoil section as illustrated.

The leading edges or nose portion of the upper and lower surface walls 28 and 30 are welded to a solid rod 32, while the trailing edges thereof are also welded to a rib 34 with a relatively narrow width, provided at the rear end portion. Furthermore, as is shown in FIG. 3, an outer liner including an upper surface liner 42 and a lower surface liner 44 is placed in relation to be overlapped with the upper and lower surface walls 28 and 30, and is fixed thereat by screwed upset type coupling members, etc. (not particularly shown).

For the above airfoil blade, the liners 42 and 44 of a corrosion resisting alloy are employed for protection against corrosion, and in order to combine the liners 42 and 44 with the surface walls 28 and 30, a novel coupling device employing upset type coupling members having metallic portions not projecting from the blade surface is employed to manufacture a blade which will not obstruct smooth air flow over the surface of the airfoil blade, as disclosed, for example, in Japanese Utility Model Publication Jikkosho No. 60-12959.

Meanwhile, as another prior art, there is also proposed an airfoil blade as shown in FIG. 4, which includes a hollow and thin-walled main body B having an external sectional shape and a plurality of screw setting portions F integrally formed within the main body B in a state as combined with said main body by extrusion molding. Openings 0 are necessarily formed during extrusion molding by core support portions to form female screwed holes Fa for set screws at the center of the respective screw setting portions F, and these openings 0 are directed towards the rear portion Ba of the main body B as disclosed, for example, in Japanese Utility Model Publication Jikkosho No. 62-14397.

In the airfoil blade as described above, since the openings 0 are arranged to be directed towards the rear portion Ba at which centrifugal force and air resistance are not exerted upon rotation of the fan impeller, a rigid assembly may be effected.

In the construction of the former prior art referred to above, many man-hours are required for the manufacture of the blade, thus undesirably resulting in cost increase, while strain, detachment, etc. at the welded portions tends to take place. Moreover, the upper or lower surface wall for the airfoil blade has a limitation in its thickness for making holes therein and effecting tapping to receive set screws.

Meanwhile, in the latter conventional arrangement, although the extrusion molding is possible for the blade of a two-dimensional curved surface, such molding becomes impossible for the blade of a complicated three-dimensional curved surface having distribution also in a radial direction of the fan impeller.

SUMMARY OF THE INVENTION

Accordingly, an essential object of the present invention is to provide an improved airfoil blade which can be processed to have a complicated three-dimensional curved surface, with substantial elimination of disadvantages inherent in the conventional airfoil blades of this kind.

Another object of the present invention is to provide an airfoil blade of the above described type, which is light in weight and stable in functioning with a high reliability, and can be readily manufactured on a large scale at low cost.

A further object of the present invention is to provide a method of manufacturing an airfoil blade of the above described type in an efficient manner.

In accomplishing these and other objects, according to one aspect of the present invention, there is provided an airfoil blade which includes one blade surface portion formed by extrusion molding, a plurality of ribs integrally formed with the one blade surface portion to extend upwardly therefrom in a generally vertical direction and having heights as will provide a curve line for the other curved blade surface portion when end faces of said ribs are connected to each other, and a sheet material applied onto the ribs along the end faces thereof to provide the other curved blade surface portion, thereby forming a blade configuration of an airfoil blade having a leading edge and a trailing edge and including hollow portions therein.

Moreover, in a modification of the above arrangement, the sheet material for the other curved blade surface portion is further formed with small holes for communication of the interior of the hollow portions with the exterior thereof so as to utilize the hollow portions as a resonator.

In another aspect of the present invention, there is provided a method of manufacturing an airfoil blade of the above described type, which includes the steps of forming by extrusion molding one curved blade surface portion which has a plurality of ribs integrally formed therewith and extending upwardly from the one curved blade surface portion in a generally vertical direction, with heights of the respective ribs being so determined as to provide a curve line for the other curved blade surface portion when end faces of the ribs are connected to each other, and also forming said the other curved blade surface portion by smoothly applying a sheet material onto the ribs along the end faces thereof so as to conform with the blade surface, and combining the sheet material with the blade surface at the outer periphery of the blade and rib portions.

By the arrangement of the present invention as described above, an improved airfoil blade of a hollow structure light in weight with a high performance may be produced, and this airfoil blade can be manufactured in such a simple process with fewer man-hours that the sheet material is applied onto the one curved surface portion formed by the extrusion molding to form the other curved surface portion for subsequent welding, and thus, it is suitable for mass production.

Furthermore, since the curved surface of the blade is divided into the upper and lower surface walls for respective formation and subsequent overlapping, the blade having a complicated three-dimensional curved surface may be produced.

BRIEF DESCRIPTION OF THE DRAWINGS

The above and other objects and features of the present invention will become apparent from the following description taken in conjunction with the preferred embodiment thereof with reference to the accompanying drawings, in which.

DETAILED DESCRIPTION OF THE INVENTION

Figure 1:
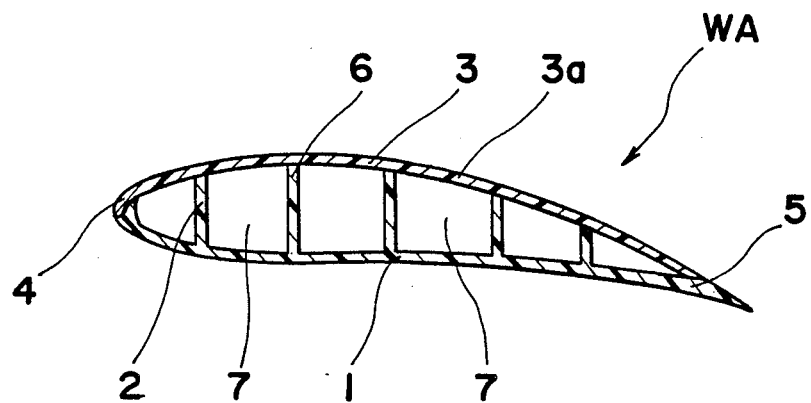
FIG. 1 is schematic cross section of an airfoil blade according to one preferred embodiment of the present invention.

Before the description of the present invention proceeds, it is to be noted that like parts are designated by like reference numerals throughout the accompanying drawings.

Referring now to the drawings, there is a shown in FIG. 1, an airfoil blade WA according to one preferred embodiment of the present invention, which includes one curved blade surface portion 1 of the airfoil blade formed by extrusion molding, a plurality of ribs 2 integrally formed with the one curved blade surface portion 1 and extending upwardly from said one curved blade surface portion 1 in generally a vertical or perpendicular direction, with heights of the respective ribs 2 being so determined as to provide a curve line for the other curved blade surface portion 3 when end faces 6 of the ribs 2 are connected to each other, and a sheet or film material 3a applied onto the ribs 2 along the end faces 6 thereof to form the other curved blade surface 3, thereby to form a blade configuration of the airfoil blade having a leading edge 4 and a trailing edge 5 and including hollow portions 7 therein.

In the construction of the airfoil blade according to the present invention as described above, the one curved blade surface portion 1 of the blade is formed by the extrusion molding including the ribs 2 through employment of a split type metal mold (not shown). For the material of the portion 1, a solid material, e.g. synthetic resin or the like may be adopted.

Subsequently, a material such as the sheet or film material 3a is placed over the end faces 6 of the ribs 2 conforming with the other blade surface for pressure contact, and connection thereof is effected at the outer periphery of the blade and the end faces 6 of the respective ribs 2.

By the above procedures, the airfoil blade has a hollow construction, by which weight reduction may be achieved with comparatively fewer man-hours so as to be suitable for mass-production.

Figure 2:
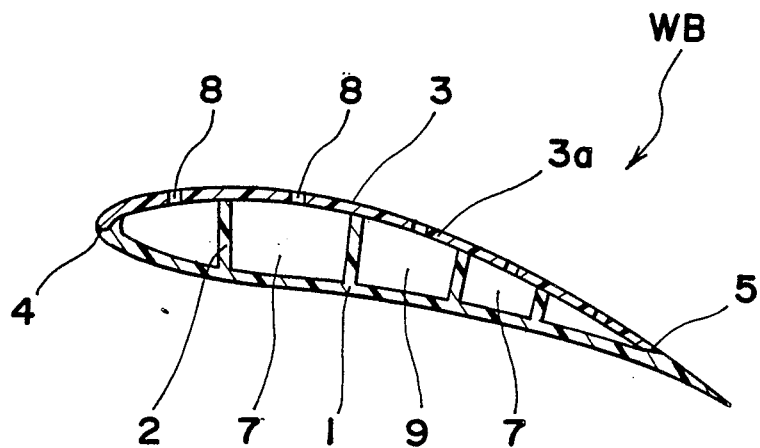
FIG. 2 is a cross section similar to FIG. 1, which particulary shows a modification thereof.
Figure 3:
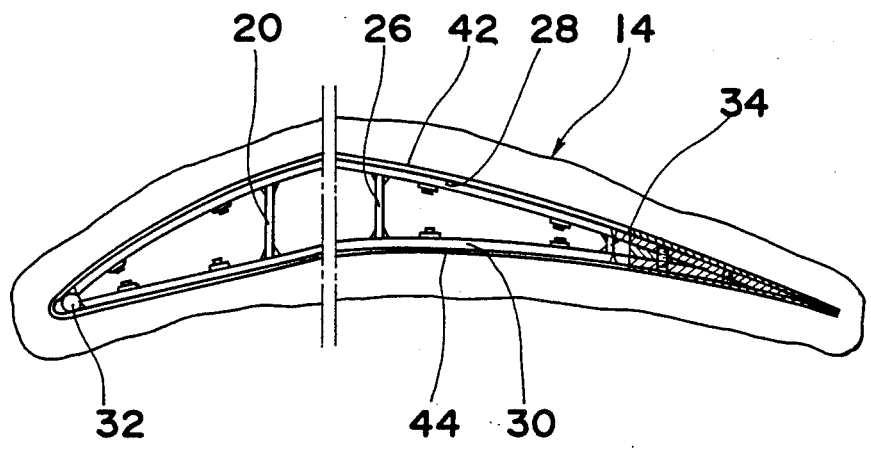
FIG. 3 is a schmatic cross section showing one example of conventional airfoil blades.
Figure 4:
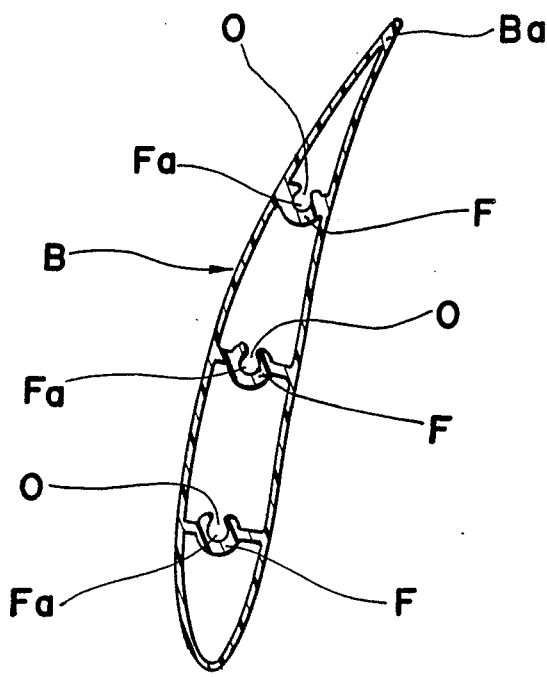
FIG. 4 is a cross section similar to FIG. 3, which particularly shows another example of conventional airfoil blades.

Referring further to FIG. 2 there is shown a modification of the airfoil blade WA as described so far with reference to FIG. 1.

In the modified airfoil blade WB in FIG. 2, the sheet material 3a for the curved blade surface portion 3 is formed with small holes 8 for communication of the interior of the hollow portions 7 with the exterior thereof so as to utilize the hollow portions 7 as a resonator 9.

By the above arrangement, noise at a specific resonant frequency may be advantageously reduced. For the determination of the diameter of each small hole 8, the following equation may be employed.

$$fo = \frac{c}{2\pi} \sqrt{\frac{d}{v}}$$

where fo is the resonant frequency, c is the speed of sound, v is the volume of each hollow portion, and d is the diameter of each small hole 8.

As is clear from the foregoing description, according to the present invention, the one curved blade surface portion of the airfoil blade is formed into the blade shape by the integral extrusion molding together with the plurality of ribs, while the other curved blade surface portion is formed by smoothly applying the sheet material along the forward end portions of the ribs to conform with the desired blade surface. Then, the sheet material is combined at the outer periphery of the blade and the forward end portions of the ribs respectively to form the airfoil blade of the hollow construction, and thus, not only the blade is reduced in its weight, but it becomes suitable for mass-production, with fewer man-hours required for manufacturing. Moreover, by a arrangement of the present invention, it becomes possible to manufacture the airfoil blade with the complicated three-dimensional curved surface.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An airfoil blade for use in a fan impeller, comprising:
    a first blade surface portion formed by extrusion molding;
    a plurality of ribs integral with said first blade surface portion and extending outwardly from said first blade surface portion, said ribs dimensioned so as to together provide a curve line along the end portions thereof;
    a sheet material disposed on said ribs of said first blade surface portion along said curve line, forming a second blade surface portion, wherein said airfoil blade is formed having a leading edge, a trailing edge, and hollow portions therein between said ribs; and
    a plurality of small holes in said sheet material forming said second blade surface portion communicating said hollow portions with the exterior thereof, whereby said hollow portions can be used as a resonator.

* * * * *